United States Patent [19]

Krantz

[11] Patent Number: 5,743,144
[45] Date of Patent: Apr. 28, 1998

[54] HYDROSTATIC TRANSMISSION GEAR DRIVE DISCONNECT

[75] Inventor: William Douglas Krantz, Ft. Wayne, Ind.

[73] Assignee: Dana Corporation, Toledo, Ohio

[21] Appl. No.: 685,500

[22] Filed: Jul. 24, 1996

[51] Int. Cl.[6] .................. F16H 37/08; F16D 11/02
[52] U.S. Cl. ............... 74/405; 192/69.9; 192/96; 475/198
[58] Field of Search ............. 74/405; 192/69.9, 192/96; 475/198

[56] References Cited

U.S. PATENT DOCUMENTS

| | | | |
|---|---|---|---|
| 1,108,936 | 9/1914 | Sintz | 92/96 X |
| 1,831,955 | 11/1931 | Harney | 192/69.9 X |
| 3,104,850 | 9/1963 | Wood | 74/405 X |
| 3,231,057 | 1/1966 | Wolf | 192/69.9 |
| 3,301,366 | 1/1967 | Steinberg | 192/96 |
| 3,687,249 | 8/1972 | Priest et al. | 74/405 X |
| 3,921,774 | 11/1975 | Hagen | 192/85 CA |
| 5,261,801 | 11/1993 | Stone | 418/69 |

*Primary Examiner*—Allan D. Herrmann
*Attorney, Agent, or Firm*—Oldham & Oldham Co., LPA

[57] ABSTRACT

A device for mechanically disengaging and re-engaging a driven axle from a hydraulic transmission allows the driven axle to "free wheel" independently. In normal operation, a set of internal splines on an end of a rotor is engaged with splining on an end of a hollow coaxial drive train shaft, the rotor and drive train shaft held in rotational engagement by the biasing force of a spring. A pin, positioned coaxially within the hollow center of the drive train shaft and having one end bearing upon the rotor, can be externally moved to overcome the biasing force and disengage the rotor from the drive train shaft. Once the external force moving the spring is removed, the set of internal splines and splines are re-engaged.

8 Claims, 2 Drawing Sheets

HYDROSTATIC TRANSMISSION GEAR DRIVE DISCONNECT

The present invention relates generally to improvements in hydrostatic transmission systems for vehicles, especially vehicles powered by internal combustion engines. More particularly, the present invention relates to hydrostatic transmission systems for motor vehicles particularly suitable for use in lawn tractors and other small motor vehicles.

BACKGROUND OF THE ART

Hydrostatic transmissions of the type described in the present invention are commonly used commercially on relatively small lawn and garden tractors. One example of a vehicle which has used a prior art hydrostatic transmission is a mid-mount lawn tractor having an engine, front and rear wheels and a working implement, such as a mower blade, mounted between the front and rear wheels. In this example, the transmission would be disposed adjacent the rear wheels and receive input torque from the engine. It is often necessary to free wheel such vehicles without aid of the engine, particularly with the drive wheels in contact with the road surface. In the prior art, manufacturers have provided a hydraulic release tow valve for this purpose, which in general has provided a satisfactory solution when the weather is warm enough that the hydraulic fluid used in the hydrostatic transmission is not too viscous. However, when the hydraulic release tow valve is used in cold weather, the large increase in the hydraulic fluid viscosity is simply too much to overcome.

A mechanical disconnection between the hydrostatic motor and the gear axle input shaft is preferable to the tow valve. In some early instances, this involved physical removal of the motor from the drive train, a draconic measure. In one solution presented in the prior art, the input shaft of the gear axle is moved during the disconnection process, but it may be preferred to move the motor output shaft rather than the gear axle input shaft.

SUMMARY OF THE INVENTION

It is, therefore, an object of the present invention to provide an mechanical disconnection between the hydrostatic transmission and the input shaft of the gear axle, so that the gear axle may turn freely without the resistance of the hydraulic fluid in the hydrostatic transmission when the mechanical disconnect is activated.

This object and others are achieved by a device for mechanically disconnecting a hydraulic transmission from at least one driven axle within a housing. Such a device comprises a rotor mounted rotatably on an end of a first shaft having an axis, a biaser, a hollow second shaft, a drive train, and a pin. The rotor is connected to the hydraulic transmission and is longitudinally movable upon the first shaft. The rotor has a drive key located coaxially with the first shaft. The biaser is located between the rotor and the shaft end, urging the rotor longitudinally away from the shaft end. The hollow second shaft is mounted coaxially with the first shaft, the second shaft being restrained from longitudinal movement along the axis. The second shaft has an end adapted for engaging the drive key of the rotor, thereby transmitting torque from the rotor to the second shaft. The drive train comprises a series of enmeshed gears, the first of the series of enmeshed gears connected to the second shaft and a final gear of the series being connected the driven axle. The pin has a first end and a second end and is positioned coaxially within the second shaft with the first end located external to the housing and the second end bearing against the rotor, so that longitudinal movement of the pin within the second shaft can push the drive key on the rotor toward the first shaft and out of engagement with the end of the second shaft.

Other advantages and novel features of the present invention will become apparent in the following detailed description of the invention when considered in conjunction with the accompanying drawings.

BRIEF DESCRIPTION OF THE DRAWINGS

In the accompanying drawings, identical parts are identified by identical reference numerals

DETAILED DESCRIPTION OF THE DRAWINGS

Figure 1:
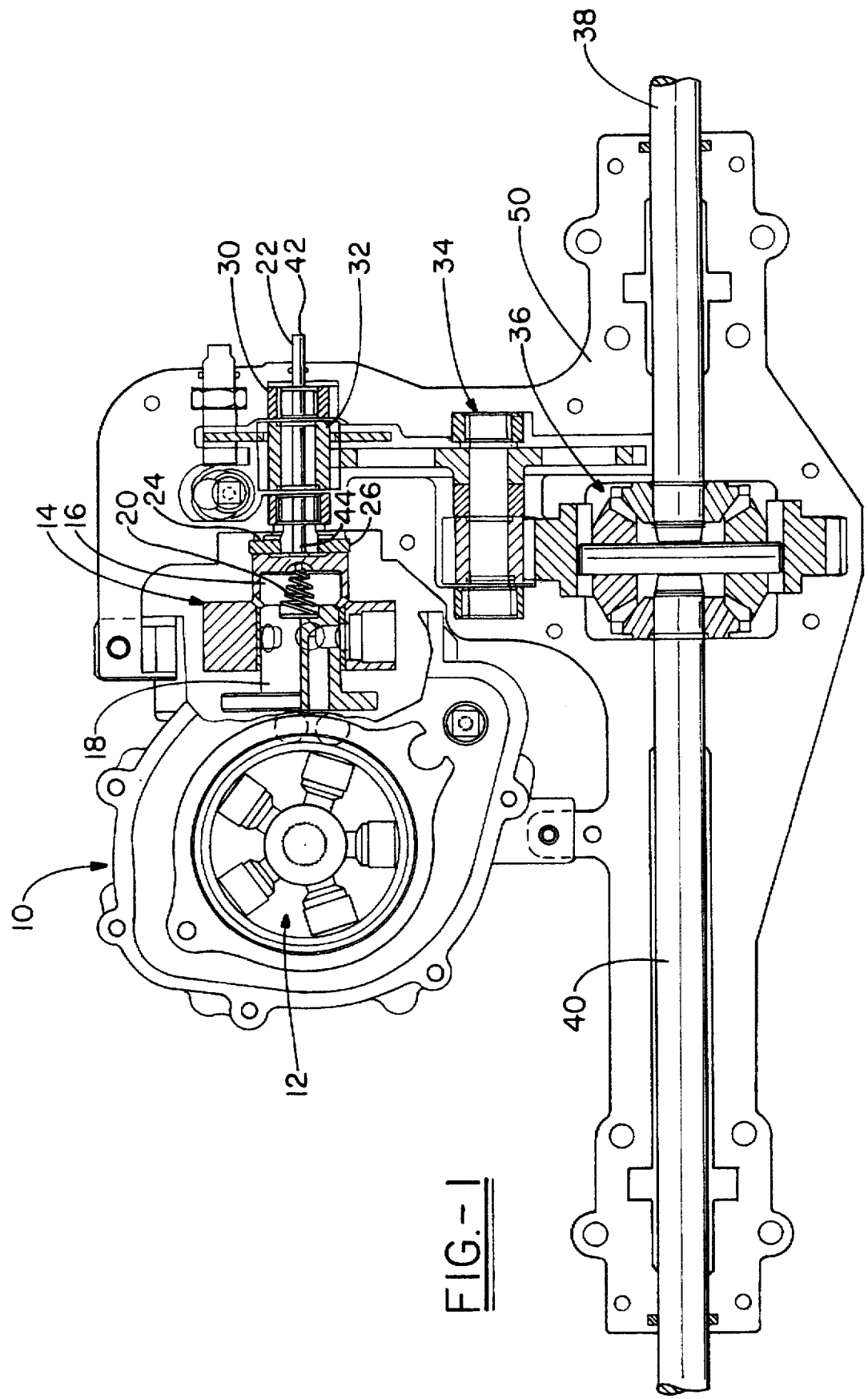
FIG. 1 is a sectional view of the present invention, showing the mechanical disconnect unactuated.
Figure 2:
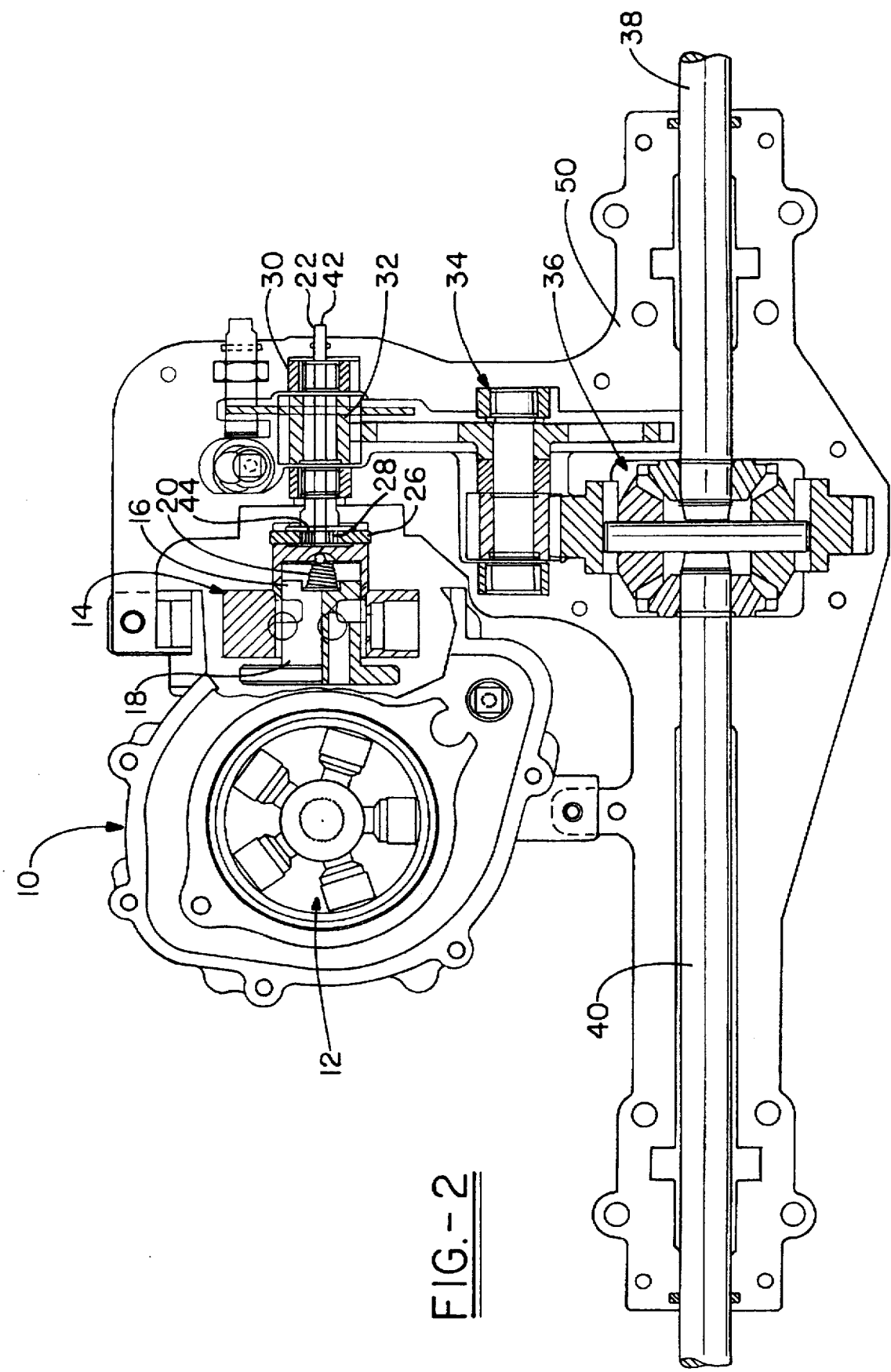
FIG. 2 is a sectional view of the present invention, with the mechanical disconnect actuated.

Referring first to FIG. 1, in which the present invention is depicted in its usual condition, a housing 10 contains a conventional hydrostatic transmission 12. A motor rotor 14 is connected to the hydrostatic transmission 12 and receives drive torque hydraulically from the hydrostatic transmission. The motor rotor 14, which has an internal cavity 16, is rotatably mounted upon a rotor pintle or first shaft 18, through which it receives a flow of hydraulic fluid. The internal cavity 16 houses a biasing means, typically a spring, especially a conical spring 20, a broader end 21 of which bears against an external face of rotor pintle 18 and a narrower end 23 of which bears against an internal face of the motor rotor 14. As seen by comparison of FIGS. 1 and 2, motor rotor 14 may move longitudinally on the rotor pintle 18, which remains fixed in position. In the first or normal position of motor rotor 14, as shown in FIG. 1, biasing means 20 is relatively uncompressed and motor rotor 14 is extended outwardly, or to the right as shown in FIG. 1. In the second position of FIG. 2, in which the present invention is depicted in the disconnected or actuated position, the motor rotor is moved inwardly towards the hydrostatic transmission, or to the left as shown in FIG. 2. In this second position the biasing means 20 is in a compressed state, the biasing force of biasing means being overcome by the leftwardly directed force provided by a tow pin 22, as will be explained in more detail below. As will be readily understood, the removal of the leftwardly directed force of the tow pin will allow the biasing means to move the motor rotor 14 back to its normal position as shown in FIG. 1.

The rightward face 24 of motor rotor 14 is provided with a internal splines 26. These internal splines 26 are closely toleranced for engagement with external splines 28 formed on the left end of input shaft 30. Input shaft 30 is a hollow shaft, and is aligned co-axially with rotor pintle 18 and motor rotor 14. Input shaft 30 and the associated external splines 28 are restrained from longitudinal motion along the axis with motor rotor 14, unlike the motor rotor. Drive torque acting on the external splines 28 turns input shaft 30, and this drive torque is passed to a gear 32, connected to input shaft 30 with conventional splining. From this splined gear 32, a conventional gear set 34 transmits the drive torque to a differential 36 and ultimately to the driven axles 38, 40 and the driven wheels (not shown). Because the input shaft 30 is longitudinally fixed in position and the gears 32, 34 are continually meshed, any drive torque which acts on external splines 28 will pass to the driven axles 38, 40. In FIG. 1, the normal condition is illustrated, with drive torque passing from the hydrostatic transmission 12 to motor rotor 14. The rightward bias provided by biasing means 20 maintains engagement of the internally splined rightward face 24 of motor rotor 14 with the coaxial external splines 28 on the left end of input shaft 30, passing the drive torque into the input shaft. From there, the drive torque passes uninterrupted to the driven axles 38, 40. All of this activity occurs with tow pin 22 in its rightward or unactuated position.

Tow pin 22 is also coaxially positioned with motor rotor 14, rotor pintle 18, and input shaft 30. Tow pin 22 is positioned internally to hollow input shaft 30, and has first and second ends 42, 44. First end 42 of tow pin 22 is located external to the overall housing 10, and particularly to the gear axle housing 50. The first end 42 thus provides the means through which the mechanical disconnect of the present invention is actuated, and the first end would typically be adapted for connection to a locking means for maintaining the tow pin 22 in its inwardly depressed or actuated position once it is moved thereto. It would not be uncommon to use the same adaptation for connection to a locking means to prevent unwanted disconnection of the gear drive. A typical adaptation would be a hole passing diametrically through the pin. The hole 51 in housing 50 coaxial with pin 22 through which the first end 42 exits the housing would typically be provided with a grease seal to lubricate the longitudinal motion of the pin 22 therein and to prevent intrusion of dirt and the like into the gearing of the housing. The second end 44 of tow pin 22 has a somewhat enlarged head 45 formed thereon, the head being larger than the internal diameter of the input shaft 30, so that the second end 44 of the tow pin cannot be pulled internal to input shaft 30. This secures the tow pin 22 into its position. The second end 44 of tow pin 22 bears directly on the rightward face 24 of motor rotor 14, and this position is maintained by the constant rightward biasing force of biasing means 20, and the leftward biasing force provided through the tow pin when the tow pin is actuated by external force acting on the first end thereof. The tow pin 22 has an external diameter along its length which is smaller than the internal diameter of the input shaft and the tow pin is not connected to the input shaft in any manner, so the tow pin and the input shaft are rotatably independent from each other.

Since the tow pin 22 acts directly on the rightward face 24 of motor rotor 14, longitudinal movement of the tow pin along its axis results in a directly corresponding movement of the motor rotor 14.

More than mere removal of external actuating force on the first end 42 of tow pin 22 is required for complete re-engagement of the external splines 28 on the input shaft 30 with the internal splines 26. Specifically, close tolerancing of the components, lead chamfers on the external splines 28 on input shaft 30 and the internal splines 26 and backlash of the input gears 32, 34 will act with the biasing force of biasing means 20 to provide the complete re-engagement.

Although the preferred embodiment described in this specification teaches the use of a tow pin to mechanically disconnect the transfer of drive torque from a hydrostatic transmission to a pair of drive wheels via a differential, it will be readily understood that the device taught herein as a "tow pin" is really a "free wheeling pin" and that the present invention has application to any situation where drive torque is transferred from a hydrostatic motor to a driven axle, such as in driving a winch.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A device for mechanically disconnecting a hydraulic transmission from at least one driven axle within a housing, the device comprising:

a rotor connected to the hydraulic transmission, said rotor mounted rotatably on an end of a first shaft having an axis, but longitudinally movable thereupon, the rotor further having a set of internal splines located coaxially with the first shaft;

a biaser located between the rotor and the shaft end, urging the rotor longitudinally away therefrom;

a hollow second shaft, mounted coaxially with the first shaft, the second shaft being restrained from longitudinal movement along the axis, the second shaft having an end adapted for engaging the internal splines of the rotor;

a drive train comprising a series of at least two enmeshed gears, a first of the at least two enmeshed gears connected to the second shaft and a final gear of the series of at least two enmeshed gears connected to each axle of the at least one driven axle; and a pin having a first end and a second end, the pin being positioned coaxially within the second shaft with the first end located external to the housing and the second end bearing against the rotor, so that longitudinal movement of the pin within the second shaft can push the internal splines on the rotor toward the first shaft and out of engagement with the end of the second shaft.

2. The mechanical disconnect device of claim 1 wherein the second end of the pin has a head formed thereon having a external diameter at least as large as the internal diameter of the hollow second shaft.

3. The mechanical disconnect device of claim 1 wherein the pin passes through a coaxial hole in the housing.

4. The mechanical disconnect device of claim 1 wherein the biaser is a spring.

5. The mechanical disconnect device of claim 1 wherein the biaser is a spring.

6. The mechanical disconnect device of claim 1 wherein the pin moves rotationally and longitudinally independently from the second shaft.

7. The mechanical disconnect device of claim 1 wherein the drive train comprises a differential connected to two driven axles.

8. The mechanical disconnect device of claim 5 wherein the spring is a conical spring with a broader end bearing against the end of the first shaft and a narrower end bearing against the rotor.

* * * * *